Patented Dec. 30, 1930

1,786,651

UNITED STATES PATENT OFFICE

ERNST HAMMEL, OF BERLIN, GERMANY, ASSIGNOR TO MAX RAUCH, OF BERLIN, GERMANY

PROCESS OF MANUFACTURING A PHOSPHATE FOR FERTILIZING

No Drawing. Application filed December 23, 1926, Serial No. 156,755, and in Germany August 19, 1926.

This invention relates to a fertilizer and method of making the same and has for its object to provide an improved fertilizer suitable for fertilizing soil, flower cultures and pond life and providing a substitute for guano.

It has been proposed heretofore to provide fertilizers made by the action of phosphoric or sulphuric acid on calcium phosphate in the presence of porous material such as ground peat, the mixture being subsequently treated with ammonia.

It has also been proposed to prepare a fertilizer derived from bones and containing phosphate mixed with ammonium chloride or nitrate and other nitrogenous bodies by treating the bones with acid, adding ammonia to neutralize the acid liquors and then evaporating to dryness without previous separation of the calcium phosphate.

According to the present invention, a fertilizer is made by treating substances such as bone meal containing or capable of yielding albumenoids or peptones with an inorganic acid and adding a potassium fertilizer, concentrating the acid treated substance to a rubber-like consistency, neutralizing with basic ammonia and finally drying the product.

In carrying the invention into effect raw bone meal not freed from glue may be used as initial material. About 100 parts of this bone meal are disintegrated by means of an approximately equal quantity of any inorganic acid (other than sulphuric acid) for instance with concentrated raw hydrochloric acid until disintegration has been completed.

During the disintegration about 20 parts of a potassium fertilizer of about 40% are slowly added and disintegrated also. The disintegrated substance is then slowly concentrated to rubber like consistency and the chloride vapours from the free hydrochloric acid in excess, are withdrawn to be regenerated to concentrated hydrochloric acid and then further treated in the disintegrated substance. The free hydrochloric acid is neutralized by addition of the corresponding quantity of ammonia, whereby valuable nitrogen is again added to the mass.

The rubber-like mass is then submitted at temperatures of 100°–120° C. in the vacuum to a drying process up to complete drying and then ground or crushed to fine powder. The powder is mixed with about 10 parts of peat-meal. The fertilizer neutralized with ammonia is specially adapted for strongly acid soil.

I claim:—

A method of making a fertilizer, consisting in producing albumin enzymes by peptonizing bone meal by disintegration with an acid, in adding a potassium fertilizer, in concentrating said albumin enzymes to rubber like consistency, in neutralizing the same with basic ammonia, and in finally drying the product.

In testimony whereof I affix my signature.

ERNST HAMMEL.